United States Patent
Nakamura et al.

(10) Patent No.: US 7,065,679 B2
(45) Date of Patent: Jun. 20, 2006

(54) REASONABLE CLOCK ADJUSTMENT FOR STORAGE SYSTEM

(75) Inventors: Takashi Nakamura, Kanagawa (JP); Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 10/807,857

(22) Filed: Mar. 24, 2004

(65) Prior Publication Data
US 2005/0223297 A1  Oct. 6, 2005

(51) Int. Cl.
*G06F 11/00* (2006.01)

(52) U.S. Cl. .......................................... 714/47; 726/26
(58) Field of Classification Search .................... None
See application file for complete search history.

(56) References Cited

U.S. PATENT DOCUMENTS

| 4,808,802 | A * | 2/1989 | Kano ........................... 235/380 |
| 5,689,699 | A * | 11/1997 | Howell et al. .................. 707/9 |
| 5,781,630 | A * | 7/1998 | Huber et al. ................. 713/178 |
| 6,393,126 | B1 * | 5/2002 | van der Kaay et al. ..... 380/241 |
| 6,915,398 | B1 * | 7/2005 | Matsubara et al. ......... 711/163 |
| 2003/0041184 | A1 * | 2/2003 | Tervo ............................. 710/1 |
| 2003/0105890 | A1 * | 6/2003 | Sakuma .......................... 710/1 |
| 2003/0155417 | A1 * | 8/2003 | Fairman ....................... 235/381 |
| 2004/0030912 | A1 * | 2/2004 | Merkle et al. ............... 713/200 |
| 2005/0005114 | A1 * | 1/2005 | Medvinsky .................. 713/168 |
| 2005/0177591 | A1 * | 8/2005 | Kanda et el. ................ 707/102 |
| 2005/0193236 | A1 * | 9/2005 | Slager et al. ................... 714/6 |

\* cited by examiner

*Primary Examiner*—Scott Baderman
*Assistant Examiner*—Gabriel L. Chu
(74) *Attorney, Agent, or Firm*—Townsend and Townsend and Crew LLP (57) ABSTRACT

A system for managing clock adjustment in a storage system is provided. The system includes a clock configured to provide a current time, wherein the current time is used to enforce a content retention period, a memory configured to store clock management information, wherein the clock management information includes a last adjustment time and a number of maximum adjustable time ranges, wherein the last adjustment time represents the time which the clock was last adjusted, and a storage access program. The storage access program is configured to receive a proposed new time for the clock, determine whether the proposed new time is reasonable using the current time, the last adjustment time and a specific range selected from the maximum adjustable time ranges, and adjust the current time of the clock to the proposed new time if it is determined that the proposed new time is reasonable. The storage access program is further configured to prevent adjustment of the clock to the proposed new time if it is determined that the proposed new time is unreasonable.

10 Claims, 5 Drawing Sheets

Fig 1: System configuration of using storage system.

Fig 2: Storage System

Fig 3: Table of Adjustable Time Range

| Period from last adjusting clock (month) | Adjustable Time Range (minute) |
|---|---|
| 0 | 0 |
| 1 | 1.2 |
| 2 | 2.4 |
| ⋮ | ⋮ |
| 120 | 144.0 |

Fig 4: Time distribution from accidental error.

Fig 6: Determination of Reasonability of adjusting clock

REASONABLE CLOCK ADJUSTMENT FOR STORAGE SYSTEM

BACKGROUND OF THE INVENTION

The present invention generally relates to clock adjustment for storage system and, more specifically, to a method and system for providing clock management and adjustment in connection with content retention in a storage system.

An important component of today's prudent business strategy is compliance with new and evolving regulations for retention of information, specifically, the processes by which records are created, stored, accessed, managed, and retained over periods of time. Whether it is emails, patient records, or financial transactions, businesses have to put in place policies, procedures, and systems to protect and prevent unauthorized access or destruction of these volumes of information. The need to archive critical business and operational content for prescribed retention periods that range from several years to forever is defined under a number of compliance regulations set forth by governments or industries. These regulations have forced companies to quickly re-evaluate and transform their methods for data retention and storage management. For example, United States government regulations on data protection now apply to health care (HIPAA), financial services (SEC 17a4), corporate accountability (Sarbanes-Oxley Act), life sciences (21 CFR Part 11), and government (DoD 5015.2-STD).

More specifically, a number of government or industry rules regulate companies as to the preservation of business activities records in a non-rewritable, non-erasable format. In one such instance, the U.S. Securities and Exchange Commission (SEC) requires all exchange members, brokers and dealers to preserve records of all their communications with their customers or clients in a non-rewritable, non-erasable format under the Securities Exchange Act of 1934 Rule 17a-4. In another instance, the NASD (National Association of Securities Dealers Inc.) has similar regulations under Rule 3010 and 3110. In many instances, the communications that are to be preserved include electronic communications, such as, emails, instant messages and voice mails.

Many existing storage systems manage preservation of their contents based on a time check. For example, a typical storage system assigns an expiration time to an associated file. The storage system, where appropriate, checks the expiration time against an internal clock to determine if the data can be overwritten. The foregoing approach has a number of shortcomings. For example, unauthorized and/or illegal tampering of the internal clock may render the time check useless, thereby allowing a file to be deleted earlier than originally authorized. Suppose a storage system is to keep certain data preserved for 3 years starting from now. Adjusting the internal clock to 3 years ahead would allow a user to delete such data before expiration of its intended retention period.

In another situation, even authorized adjustment of the internal clock may inadvertently render the time check meaningless. The internal clock may be prone to accidental error including, for example, inaccuracy resulting from clock failure or natural variance occurring out of routine operations or circumstances not related to the internal mechanics of the clock. As a result, the storage system needs to allow at least an authorized user to adjust the internal clock to the correct time. However, an authorized user may enter the incorrect time thereby affecting the retention periods for the corresponding files.

A number of methods currently exist which allow an internal clock to be adjusted. In one method, the network time protocol (NTP) is used. NTP specifies formal structure and summarizes information that is useful for its implementation. NTP provides the mechanisms to synchronize time and coordinate time distribution in a large, diverse internet operating at various rates and media ranging from ordinary coaxial cable to optical fiber. NTP uses a returnable-time design in which a distributed subnet of time servers operating in a self-organizing, hierarchical-master-salve configuration synchronizes local clocks within the subnet to national time standards via wire or radio. The time servers can also redistribute reference time via local routing algorithms and time daemons. Further information can be found at RFC 1305.

In another method, automatic adjustment of self-contained radio-clock is provided by means of a time mark. More specifically, a time measuring method is combined with an automatic rate correction process in a digital or quasi-analog clock. The clock rate deviation data is repeatedly measured, in a predetermined lock-in-range, and derived from the clock oscillator frequency, by means of a time mark received from a transmitter. The deviation data is then stored and used for correcting the clock rate and the oscillator frequency whereby the stored data is maintained until the arrival of the next time mark.

These methods merely focus on how to adjust an internal clock based on a reference time. They do not, however, check the reasonableness of the reference time. As a result, if the reference time is incorrect, the internal clock will be adjusted incorrectly as well.

Hence, it would be desirable to provide a method and system that is capable of solving the foregoing problems, as well as others, with respect to proper clock adjustment in connection with data retention in storage systems.

BRIEF SUMMARY OF THE INVENTION

A system for managing clock adjustment in a storage system is provided. The system includes a clock configured to provide a current time, wherein the current time is used to enforce a content retention period, a memory configured to store clock management information, wherein the clock management information includes a last adjustment time and a number of maximum adjustable time ranges, wherein the last adjustment time represents the time which the clock was last adjusted, and a storage access program.

The storage access program is configured to receive a proposed new time for the clock, determine whether the proposed new time is reasonable using the current time, the last adjustment time and a specific range selected from the number of maximum adjustable time ranges; and adjust the current time of the clock to the proposed new time if it is determined that the proposed new time is reasonable. The storage access program is further configured to prevent adjustment of the clock to the proposed new time if it is determined that the proposed new time is unreasonable.

In one embodiment, when determining whether the proposed new time is reasonable, the storage access program calculates a first difference between the proposed new time and the current time, calculates a second difference between the current time and the last adjustment time; and selects the specific range from the number of maximum adjustable time ranges based on the second difference. If the first difference is less than or equal to the specific range, the proposed new time is determined to be reasonable.

The system of the present invention provides a method that prohibits illegal clock adjustment operations. When a user of the storage system tries to adjust the clock in the storage system, the storage system confirms the reasonability of the proposed clock adjustment. If the storage system determines that the proposed clock adjustment is reasonable, the storage system adjusts the clock to the proposed new time; otherwise, the storage system prevents adjustment to the clock and invokes error processing routines.

In one aspect, the reasonability check is performed based on two time differences. One is the time difference between the proposed new time and the current time of the clock. The second is the time difference between the current time and the last adjustment time. This second time difference is used to select an appropriate maximum adjustable time range. If the first time difference is less than or equal to the selected maximum adjustable time range, then the proposed new time is considered reasonable and adjustment is made to the clock; otherwise, the proposed new time is considered unreasonable and no adjustment is made to the clock.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
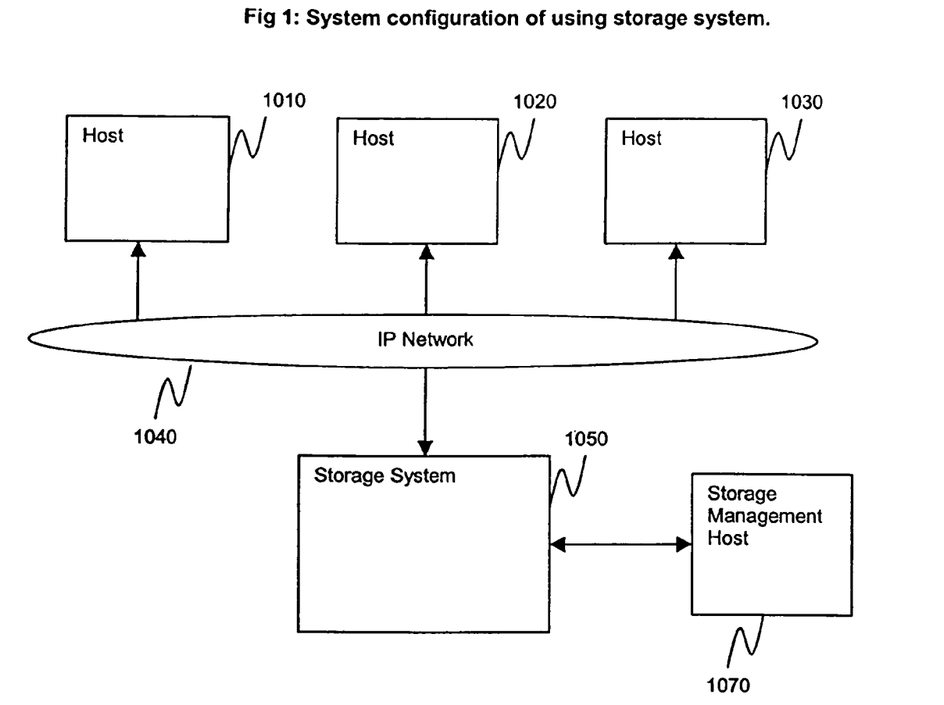
FIG. 1 is a simplified block diagram illustrating a system configuration that can be deployed in connection with the present invention.

The present invention in the form of one or more exemplary embodiments will now be described. FIG. 1 is a simplified block diagram illustrating a system configuration that can be deployed in connection with the present invention. This system configuration includes a number of hosts 1010, 1020, 1030, an Internet Protocol (IP) network 1040, a storage system 1050 and a storage management host 1070. Hosts 1010, 1020, 1030 communicate with the storage system 1050 via the IP network 1040 for purposes of satisfying their storage needs. It should be understood that other computer networks, such as, Fibre Channel network, can be used in lieu of the IP network 1040. The storage system 1050, in turn, is connected to the storage management host 1070. Storage management host 1070 manages the various features and operations of the storage system 1050. For example, the storage management host 1070 can configure an accessible host of the storage system 1050; and storage management host 1070 can also adjust an internal clock of the storage system 1050.

Figure 2:
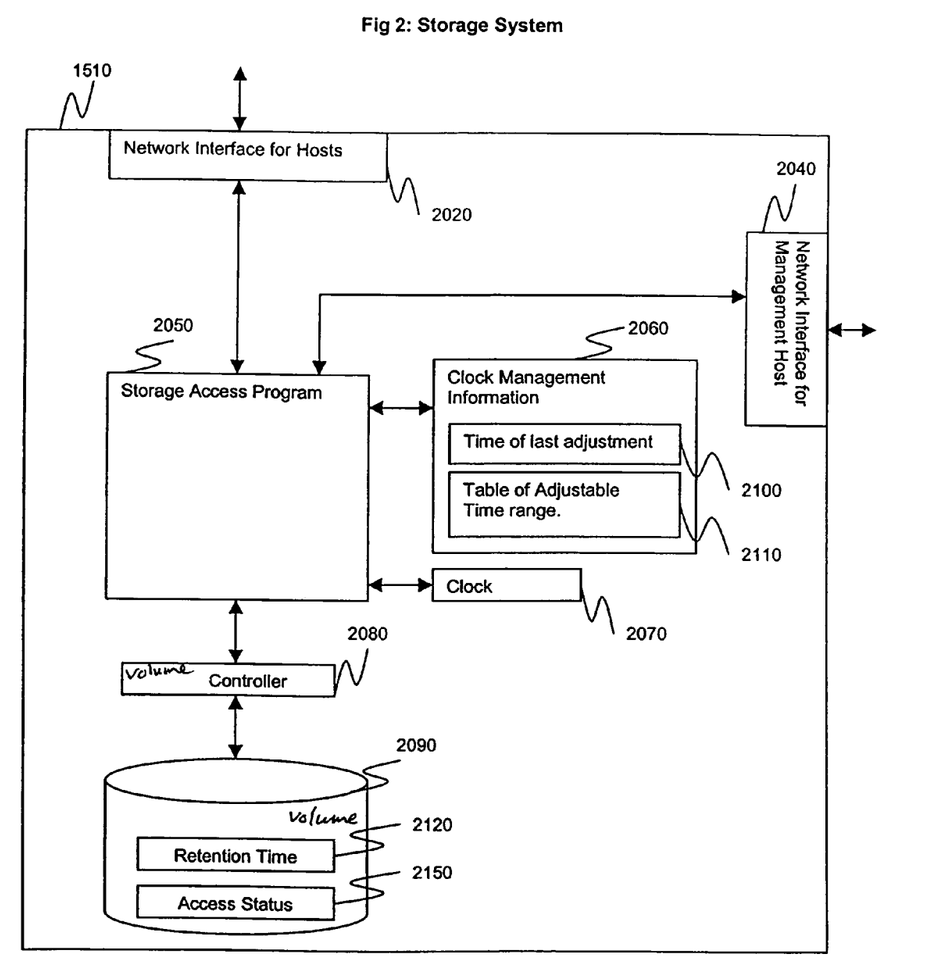
FIG. 2 is a simplified block diagram illustrating an exemplary embodiment of a storage system in accordance with the present invention.

FIG. 2 is a simplified block diagram illustrating an exemplary embodiment of a storage system 1050 in accordance with the present invention. The storage system 1050 provides the capability to perform access functions with respect to volume 2090 and prevent hosts 1010, 1020, 1030 from overwriting the data stored under volume 2090 within a specified time period, as will be further described below. In one embodiment, the volume 2090 is a physical device that comprises a single magnetic disk drive, such as, a hard disk drive. However, it should be understood that, in other embodiments, the volume 2090 may be a logical device comprising a number of physical disk drives. In one exemplary embodiment, the various functions and operations to be performed by the storage system 1050 is handled by the storage access program 2050.

The storage system 1050 performs a number of functions with respect to volume 2090. One of these functions relates to writable and non-writable management of volume 2090. To configure the volume 2090, users send commands to the storage access program 2050 using the storage management host 1070. The commands specify various write access conditions for the volume 2090 including, for example, the writable/non-writable status and any retention period. In response to the commands, the storage access program 2050 sets the access status 2150 and the retention time 2120 associated with the volume 2090.

In the case where the volume 2090 is to be configured as non-writable for a specified period, the storage access program 2050 sets the access status 2150 associated with the volume 2090 to "non-writable" via the volume controller 2080. The storage access program 2050 also calculates the end time of the non-writable or retention period by adding the retention period provided by the user to the current time obtained from the internal clock 2070. The end time of the retention period is then stored into the retention time counter 2120 associated with the volume 2090. The storage access program 2050 then returns the relevant processing information to the storage management host 1070.

In the case where the volume 2090 is to be configured as writable, the storage access program 2050 performs a number of checks to ensure that the volume 2090 can be configured as such. First, the storage access program 2050 checks the access status 2150 associated with the volume 2090. If the access status 2150 indicates that the volume 2090 is already configured as writable, the storage access program 2050 returns the relevant processing information to the storage management host 1070 indicating that the volume 2090 is already writable.

On the other hand, if the access status 2150 indicates that the volume 2090 is currently configured as non-writable, the storage access program 2050 compares the value stored in the retention time counter 2120 associated with the volume 2090 to the current time obtained from the clock 2070. If the value of the retention time counter 2120 is later than current time, the storage access program 2050 does not change the access status 2150 to "writable"; in other words, the storage access program 2050 leaves the access status 2150 as "non-writable". The storage access program 2050 also returns relevant processing information to the storage management host 1070 indicating, for example, that the specified retention period for the volume 2090 has not yet expired. However, if the value of the retention time counter 2120 is earlier than the current time, meaning that the specified retention period for the volume 2090 has already expired, the storage access program 2050 sets the access status 2150 to "writable" and clears the retention time counter 2120. The storage access program 2050 further returns relevant processing information to the storage management host 1070.

Another function performed by the storage access program 2050 relates to read/write request management of volume 2090. Read/write requests issued by the hosts 1010, 1020, 1030 are passed through the network interface for host 2020 to the storage access program 2050.

In the case where a read request is received, the storage access program 2050 reads the relevant data from the volume 2090 via the volume controller 2080 and returns the data to the requesting host 1010, 1020 or 1030 through the network interface for host 2020.

In the case where a write request is received, the storage access program 2050 checks the access status 2150 associated with the volume 2090. If the access status 2150 indicates that the volume 2090 is non-writable, the storage access program 2050 does not perform the write request. In other words, no data is written to the volume 2090. The storage access program 2050 also returns relevant processing information to the requesting host 1010, 1020 or 1030 through the network interface of host 2020 indicating, for example, that the write request is not performed because relevant volume is classified as non-writable.

On the other hand, if the access status 2150 indicates that the volume 2090 is writable, then the storage access program 2050 writes the data into the volume 2090 and returns relevant processing information to the requesting host 1010, 1020 or 1030 through the network interface for host 2020 indicating, for example, that the write request has been successfully performed.

In one embodiment, the storage system 1050 has one volume 2090. However, it should be understood that, in other embodiments, the storage system 1050 may have multiple volumes and each volume is configured as writable or non-writable as described above.

As mentioned above, the storage system 1050 utilizes the clock 2070 to provide the current time when calculating the end of the retention period associated with the volume 2090 as well as checking whether the volume 2090 can be configured as "writable". In one exemplary embodiment, the clock 2070 is user-adjustable. In other words, a user is able to issue commands to direct the storage system 1050 to adjust the clock 2070 to a new time. The commands are issued via the storage management host 1070 and processed by the storage access program 2050.

Before adjusting the clock 2070 to the new time, the storage access program 2050 first determines the reasonability of the new time using the clock management information 2060. If the new time is reasonable, the storage access program 2050 adjusts the clock 2070 to the new time. However, if the new time is not reasonable, the storage access program 2050 does not perform any adjustment to the clock 2070 and informs the user accordingly.

In one embodiment, the clock management information 2060 contains two categories of information. One category is the time of last adjustment 2100. Preferably, the time of last adjustment 2100 is stored in non-volatile media (for example, flash ROM, disk drive, etc.) that can retain the data notwithstanding any power loss. The second category is a table of adjustable time range 2110. In one embodiment, the table of adjustable time range 2110 may be stored on permanently unchangeable media (for example, ROM, etc). In alternative embodiments, the table of adjustable time range 2110 may be stored on the volume 2090 or other non-volatile memory devices. Furthermore, in some embodiments, the table of adjustable time range 2110 is changeable under the control of, for example, the storage management host 1070.

Figure 3:
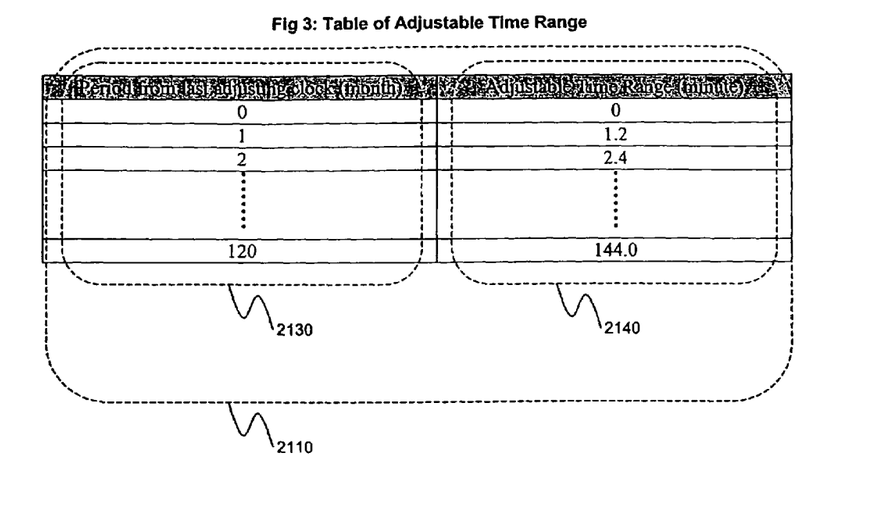
FIG. 3 is a simplified table illustrating an example of a table of adjustable time range in accordance with the present invention.

FIG. 3 illustrates an example of the table of adjustable time range 2110. As shown in FIG. 3, the table 2110 further includes two tables 2130 and 2140. The first table 2130 contains a number of entries relating to periods from last adjustment. In this example, the period from last adjustment is based on months. The entries correspond to the number of months, ranging from 1 month to 120 months. However, it should be understood that other units of time, for example, days, weeks or hours, can also be used.

The second table 2140 contains entries relating to maximum adjustable time ranges. In this example, the adjustable time range is based on minutes. Each entry in the second table 2140 represents a maximum adjustable time range and corresponds to an associated entry in the first table 2130. In one embodiment, the entries representing the adjustable time ranges 2140 are obtained by statistical calculation, as will be further described below.

The table of adjustable time range 2110 is interpreted and used as follows. The storage access program 2050 first calculates the period from last adjustment using the time of last adjustment 2100 and the current time obtained from the clock 2070. Once the period from last adjustment is determined, the corresponding entry representing the maximum adjustable time range for that period is retrieved from the second table 2140. For example, if 1 month is past since the clock 2070 was last adjusted, the maximum adjustable time range for clock adjustment is 1.2 minutes (72 seconds). Hence, if the current clock time is 12:34:00, the storage access program 2050 allows the clock 2070 to be adjusted between the range 12:32:48 and 12:35:12 (i.e., 72 seconds before and after 12:34:00 for a range of 144 seconds).

It should be noted that, in some embodiments, adjustment to the clock 2070 may be subject to additional conditions. For example, one condition may include prohibiting adjustment of the clock 2070 ahead of its current time. Based on the disclosure and teachings provided herein, a person of ordinary skill in the art will know of other conditions that can be imposed with respect to adjustment of the clock 2070.

Figure 4:
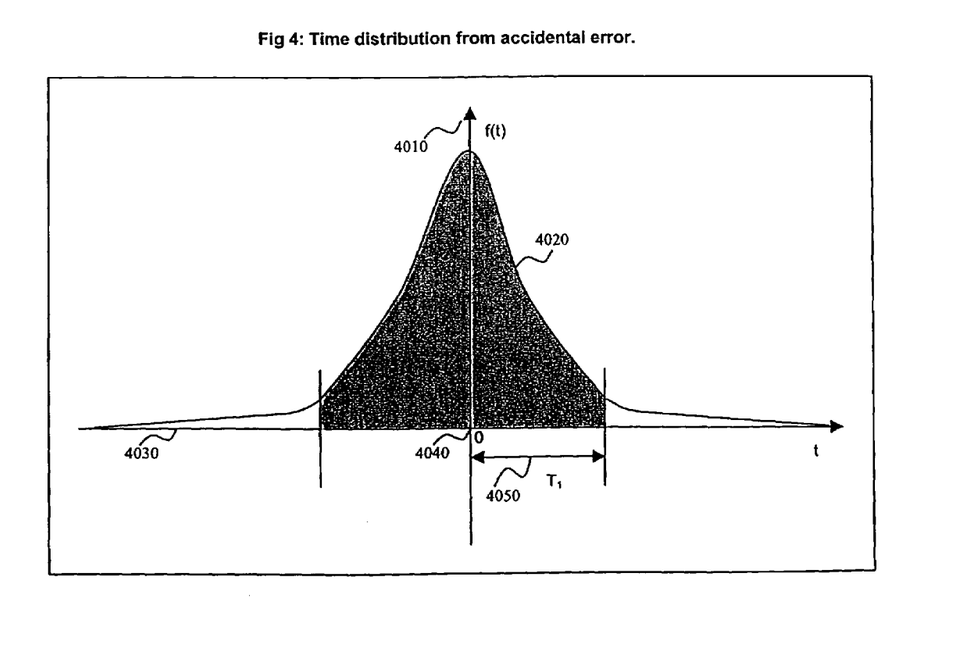
FIG. 4 is a simplified graph illustrating the time distribution from accidental error of a clock.

As noted above, entries in the second table 2140 representing maximum adjustable time ranges are derived using statistical calculation. FIG. 4 illustrates the time distribution from accidental error of the clock 2070. As noted above, accidental error includes, for example, inaccuracy resulting from clock failure or natural variance arising out of routine operations or circumstances not related to the internal mechanics of the clock 2070. Supposing that the accidental error distribution of the clock 2070 in the storage system 1050 approximately equals to a statistical standard probability density distribution function. Curve 4020 representing a statistical standard probability density distribution function shows the accidental error distribution of the clock 2070 in the storage system 1050. Horizontal axis 4030 represents the time shift of the clock 2070 that results from accidental error of the clock 2070. Vertical axis 4010 represents the corresponding probability density.

The statistical standard probability density distribution function is expressed in the following equation (eq. 4.1).

$$f(t) = \frac{1}{\sqrt{2\pi}\,\sigma} e^{-\left(\frac{t}{\sigma}\right)^2} \qquad \text{(eq. 4.1)}$$

$\sigma$: Standard deviation.

In this case, the standard deviation corresponds to the monthly error rate of the clock 2070. In general, the average monthly error rate of the clock 2070 is plus-minus 15 seconds.

The maximum adjustable time ranges stored in the second table 2140 are calculated using the equation (eq. 4.1). Before the calculations are performed, the allowable probability is defined and the clock accuracy is determined.

Allowable probability means the degree of accidental error that users of the storage system 1050 can allow. The closer the allowable probability is to 100%, the larger the range users of the storage system 1050 have for adjusting the clock 2070. Preferably, the allowable probability does not equal 100%. The shaded area in FIG. 4 represents the probability that the clock 2070 deviates between (exact time−T1) and (exact time+T1) after one month.

Maximum adjustable time range T1 4050 is obtained by solving the following equation (eq. 4.2).

$$\text{Allowable Probability} = \int_{-T1}^{T1} f(t)dt \qquad (eq. 4.2)$$

For example, 1.2 (minutes) (which correspond to a period of 1 month from last adjustment) as illustrated in the second table 2140 is obtained by solving eq. 4.2 when the standard deviation is 15 (seconds) and the allowable probability is 99.9999%. The maximum adjustable time range after 2 months or more is also calculated by solving eq. 4.2, but the deviation of 2 month or more is different from deviation of 1 month. In this implementation, it is supposed that n times the maximum adjustable time range after one month (T1) equals to the maximum adjustable time range after n-month (Tn) (i.e., n×T1=Tn).

It should be understood that the values shown in the table of adjustable time range 2110 in FIG. 3 are provided for illustration only. The values of the table of adjustable time range 2110 may vary depending on the clock accuracy, the allowable probability and/or the method of statistical calculation. Based on the disclosure and teachings provided herein, a person of ordinary skill in the art will appreciate how to derive the values for the table of adjustable time range depending on various factors including, for example, system design, constraints and requirements.

In one embodiment, the table of adjustable time range 2110 is stored as part of the storage system 1050 and used to provide reasonability information to determine whether clock adjustment is allowed. The table of adjustable time range 2110 can be modified or updated as needed. In some embodiments, information equivalent to the data stored in the table of adjustable time range 2110 is calculated as needed on an ad hoc basis when determining whether a clock adjustment is allowed. For example, each time a request for clock adjustment is received, the storage access program 2050 performs the calculations, as described above, to derive the maximum adjustable time range.

Figure 5:
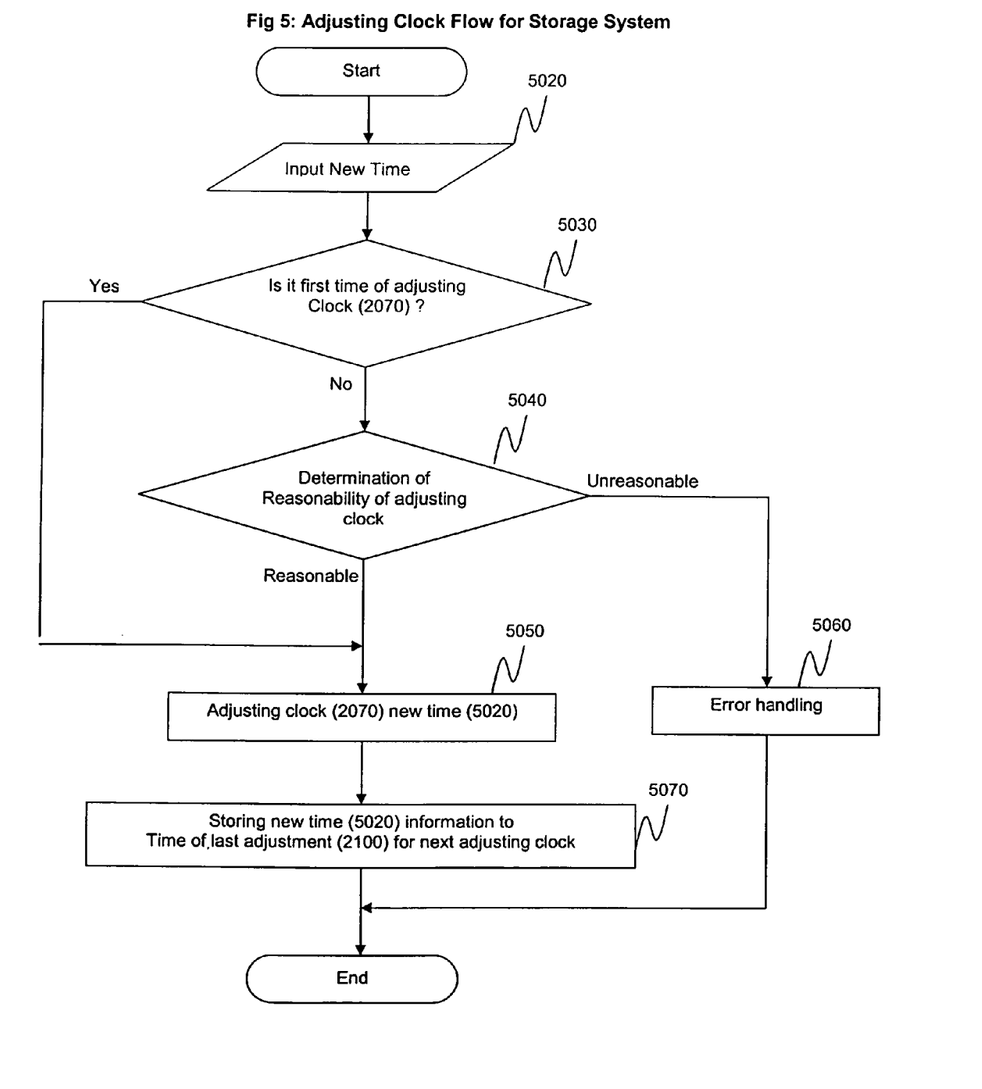
FIG. 5 is a flow diagram illustrating the operational flow of performing clock adjustment in accordance with the present invention.

FIG. 5 illustrates the operational flow of performing clock adjustment. The storage access program 2050 controls the performance of clock adjustment. As shown in FIG. 5, at 5020, a user of the storage management host 1070 inputs a new time to be used in adjusting the clock 2070. The storage access program 2050 receives the new time from the storage management host 1070 through the network interface for management host 2040.

In 5030, the storage access program 2050 checks whether the clock 2070 is adjusted for the first time. Generally, the initial clock adjustment is performed by a storage system vendor during calibration. Before the storage system 1050 is released into the market for sale, the clock 2070 is adjusted to the appropriate time by the vendor. The storage access program 2050 checks whether the clock 2070 is adjusted for the first time by examining the time of last adjustment 2100. If the clock 2070 has never been adjusted, the time of last adjustment 2100 should have no value (e.g., the time of last adjustment 2100 has space, null, etc.). If the storage access program 2050 determines that the clock 2070 is adjusted for the first time, at 5050, the storage access program 2050 performs the clock adjustment using the new time provided by the user. The time of last adjustment 2100 is also updated.

If it is determined that the clock 2070 is not adjusted for the first time, at 5040, the storage access program 5040 checks the reasonability of the new time provided by the user. Details with respect to the reasonability check are further described below. If the new time is determined to be unreasonable, at 5060, error processing is invoked including, for example, showing error message, logging error event, etc. If the new time is determined to be reasonable, the storage access program 2050 adjusts the clock 2070 to the new time at 5050 and updates the time of last adjustment 2100 at 5070. It should be noted that the operations performed in connection with 5050 and 5070 can be carried out in any order or in parallel.

Figure 6:
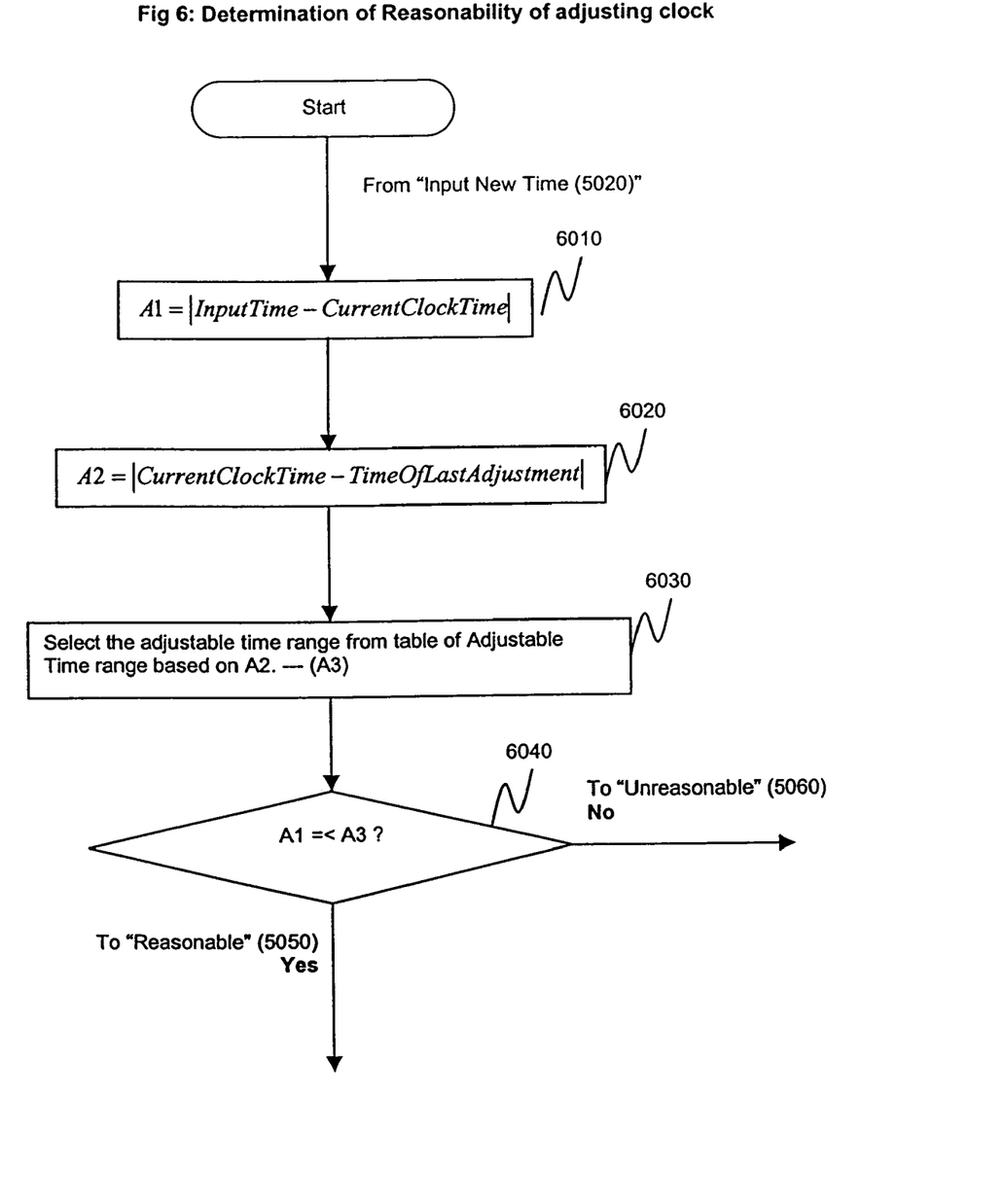
FIG. 6 is a flow diagram illustrating the operational flow of the reasonability check in accordance with the present invention.

FIG. 6 illustrates the operational flow of the reasonability check. At 6010, the time difference A1 between the new time provided by the user and the current time obtained from the clock 2070 is calculated. At 6020, the time difference A2 between the time of last adjustment 2100 and the current time obtained from the clock 2070 is calculated. At 6030, the appropriate maximum adjustable time range A3 is selected from the table of adjustable time range 2110 based on A2.

At 6040, the storage access program 2050 compares time difference A1 and the selected maximum adjustable time range A3 to determine the reasonability of the new time provided by the user. If time difference A1 is greater than the selected maximum adjustable time range A3, then the new time is determined to be unreasonable. If the time difference A1 is equal to or less than the selected maximum adjustable time range A3, then the new time is determined to be reasonable. It should be understood that the reasonability check can be performed using other criteria or factors depending on, for example, the system design and/or requirements. Based on the disclosure and teachings provided herein, a person of ordinary skill in the art will know of other ways and/or methods to perform the reasonability check in accordance with the present invention.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

The present invention can be deployed in any storage system that uses a clock to manage content retention. The present invention can be used to manage clock adjustment to ensure that clock adjustment is restricted to a reasonable time range. Such restriction minimizes illegal clock adjustments and thus ensures the integrity of content retention.

The present invention can be implemented as an integrated part of a storage system or as a modular system that cooperates with the storage system. Based on the disclosure and teachings provided herein, a person of ordinary skill in the art will appreciate the various ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A storage system coupled to a host, the storage system comprising:
   at least one data unit;
   a clock configured to provide a current time, wherein the current time is used to be compared with a retention time of the at least one data unit to prevent the host from overwriting data stored in the at least one data unit before the retention time;
   a memory configured to store clock management information; and
   a storage access program configured to:
      receive a proposed new time for the clock;
      determine whether a difference between the current time and the proposed new time falls within a specific range based on the clock management information; and
      adjust the current time of the clock to the proposed new time if it is determined that the difference falls within the specific range.

2. The storage system of claim 1 wherein the storage access program is further configured to prevent adjustment of the clock to the proposed new time if it is determined that is the difference does not fall within the specific range.

3. The storage system of claim 1 wherein the at least one data unit is configured by a plurality of disk drives.

4. The storage system of claim 1 wherein the clock management information includes a table having a plurality of maximum adjustable time ranges; and
wherein the specific range is selected from the plurality of maximum adjustable time ranges.

5. The storage system of claim 4 wherein the plurality of maximum adjustable time ranges are calculated using a statistical method.

6. The storage system of claim 4 wherein the clock management information further includes a last adjustment time, the last adjustment time representing the time that the clock was last adjusted; and
   wherein the storage access program is further configured to calculate a difference between the current time and the last adjustment time to select the specific range from the plurality of maximum adjustable time ranges.

7. A method for managing clock adjustment in a storage system, the storage system having a clock providing a current time for managing a retention time of at least one data unit, the method comprising:
   receiving a proposed new time for the clock;
   determining whether a difference between the current time and the proposed new time falls within a specific range; and
   adjusting the current time of the clock to the proposed new time if it is determined that the difference falls within the specific range.

8. The method of claim 7 further comprising:
   preventing adjustment of the clock to the proposed new time if it is determined that the difference does not fall within the specific range.

9. The method of claim 7 wherein the specific range is calculated using a statistical method.

10. The method of claim 9 further comprising:
    calculating a difference between the current time provided by the clock and a last adjustment time to select the specific range, the last adjustment time representing the time which the clock was last adjusted.

* * * * *